No. 757,778. PATENTED APR. 19, 1904.
R. SCHRADER.
PROCESS OF SEPARATING STARCH BY CENTRIFUGAL ACTION.
APPLICATION FILED OCT. 28, 1902.
NO MODEL.
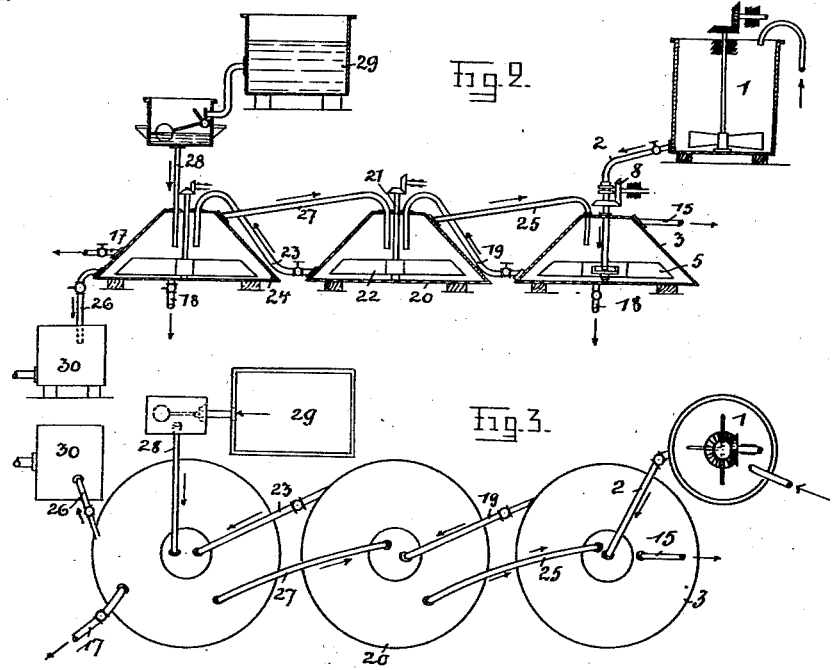
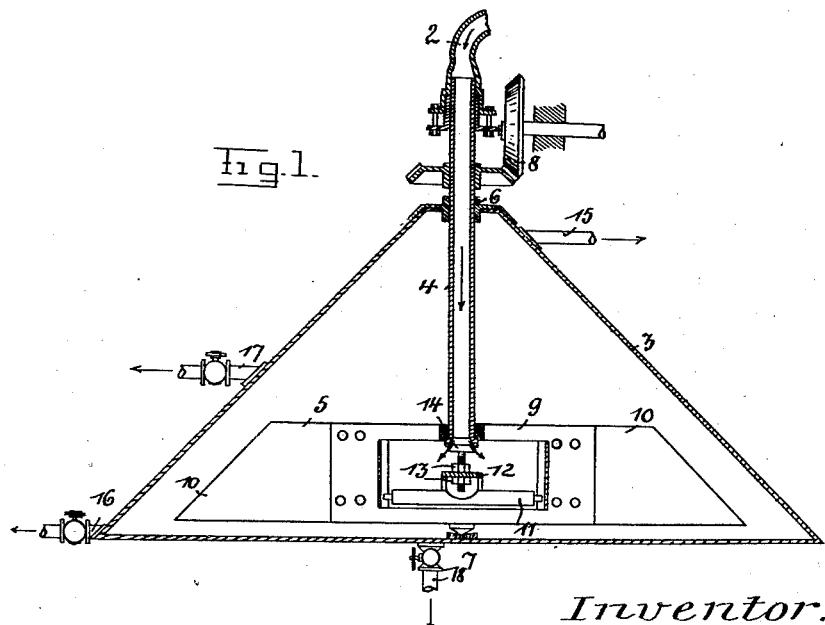
Witnesses:
E. B. Bolton
H. M. Kuehne
Inventor:
Richard Schrader
By 
his Attorneys.

No. 757,778.

Patented April 19, 1904.

UNITED STATES PATENT OFFICE.

RICHARD SCHRADER, OF SIERAKOWO, GERMANY.

PROCESS OF SEPARATING STARCH BY CENTRIFUGAL ACTION.

SPECIFICATION forming part of Letters Patent No. 757,778, dated April 19, 1904.

Application filed October 28, 1902. Serial No. 129,170. (No specimens.)

*To all whom it may concern:*

Be it known that I, RICHARD SCHRADER, a subject of the Emperor of Germany, and a resident of Sierakowo, Germany, have invented certain new and useful Improvements in Processes of Separating Starch by Centrifugal Action, of which the following is a specification.

In order to separate matter from fluids suspended therein or to separate two fluids of different specific gravity mixed together, centrifugal action has hitherto been utilized by placing the fluids in rapidly-rotating drums, where the desired separation then took place under the influence of centrifugal force. This process, however, is restricted to those cases only in which the difference of the specific gravity of the substances to be separated was not too great. If the matters to be separated were considerably heavier than the fluid containing them, the difficulty has been overcome by placing the fluid in a centrifugal device covered with filter-cloths, whereby the lighter fluid is impelled through the cloths and the heavier constituents are retained within the centrifugal device and removed by hand. In this process continuous working is impossible.

Now the subject of the present process is a new centrifugal process which renders possible in uninterrupted working the treatment of fluids which contain proportionately heavy matters suspended in them. The essence of the present invention consists in this, that the vessel containing the fluid is not caused to rotate, but remains still.

For producing centrifugal tendency according to the present invention a shaft with vanes is used which rotates rapidly in the fixed vessel. The fluid, which may, if necessary, be introduced through the hollow shaft, is therefore under centrifugal force; but, and herein consists the novelty, there is also the friction of the heavier parts on the fixed wall of the vessel, and in consequence of this friction the gravitation inherent in the stuff is utilized independently of the centrifugal action, while the suspended matters rubbing on the fixed wall of the vessel sink to the bottom. If the vessel be given a form tapering upward, this effect is increased still more, because the matters in suspension are then driven in common by both centrifugal action and gravitation in the same direction.

An apparatus for carrying out the improved process is shown in the accompanying drawings, in which—

Figure 1 is a sectional view of a single separation. Fig. 2 is a vertical sectional view of a complete apparatus, and Fig. 3 a diagrammatic plan view.

The fluid to be treated is introduced through the pipe 2 to the reservoir 3, which in the modification illustrated has a conical form tapering from the base upward. The pipe 2 is suitably joined to the hollow shaft 4, to which a stirring-vane 5 is secured at the bottom of the vessel 3. The hollow shaft 4 is journaled at the top and at the bottom has a step-bearing 7. The driving is effected by bevel gear-wheel 8 from any desired source of power. A frame 9 on the shaft 4 carries the stirring-vane 10. In order to automatically regulate the influx of fluid to be treated, a vertically-guided float 11 is arranged within the frame 9, which float carries on a cross-piece 12 a valve-body 14, adjustable by means of the two nuts 13. The valve-body 14 fits in the under end of the shaft 4, which is formed as a valve-seat. The supply of fluid can thus be regulated by this float-valve. The valve may, however, be omitted or replaced by any other device of similar action. The regulation of the supply of the fluid to be treated may also be effected by pumps or the like, thus entirely obviating the employment of the valve. On the vessel 3 are fitted outlets 15, 16, 17, and 18, the closing devices, size and position of which on the vessel are chosen according to the nature of the fluids to be treated and the substances to be separated.

The present process is suitable for fluids of all kinds in which substances are suspended. Drain-water, &c., which is now cleaned in settling-reservoirs through deposition, could be treated according to the same process and, moreover, substances which are now separated by washing, flooding, and similar processes in order to free them from admixtures, such as starch, washed chalk, coloring-matters, and thin liquors on the fluid remaining in the manufacture of sugar from beets after the initial saturation. In starches there is still a further advantage, that the starch in consequence of the motion remains fluid and can go through the apparatus without interruption. Consequently the present invention can be extensively employed for cleansing crude starch liquor, being then suitably modified in the manner described, as follows: The process so modified consists chiefly in this, that the crude starch liquor or milk passes in series through a number of centrifugal whirling vats of the sort previously described or of similar centrifugal apparatus, in which it is repeatedly cleaned and concentrated by centrifugal action. The drain-water of each single apparatus is again led back to the previous one, so that drain-water only thus flows continuously from the first apparatus. The cleansing-water, on the other hand, is only introduced into the last apparatus and then mixed with the remaining saturated water, or milky liquid goes backward oppositely to the starch-milk through the set of apparatus, so as to leave the installation through the first apparatus. The starch-milk and the cleansing-water thus pass through the installation in opposite directions, whereby the starch becomes continually cleaner, while the water becomes continually more mixed with the dirt and saturated water. At the same time starch-milk is so far concentrated by the centrifugal action that it is suitable for further treatment. In order to impel the starch-milk and also the saturated or drain water from the one apparatus into the other, according to the present process centrifugal action is utilized. By this action caused in the fixed vessels the fluids present in the various apparatus receive such a high speed that without further assistance they can be led by suitable conduits from one apparatus to the other. For the better utilization of the velocity possessed by these fluids the conduits are joined tangentially to the apparatus.

The apparatus used correspond in principle to those represented in Fig. 1. They can, however, be of any other desired form, according to the kind of starch, or from other reasons. An installation suitable for carrying out the present invention is represented diagrammatically in Fig. 2 in side view and in Fig. 3 in plan. The crude starch-milk coming from the washing apparatus is raised in a whirling vessel 1, Fig. 2, and flows from there through the pipe 2 into the first whirling vat or centrifugal apparatus 3. The outlet-pipe 15 is intended for the saturated water, the pipe 16 for the cleansed starch-milk, and, if desired, 17 also for lighter starch, and 18 for sand and heavier particles of matter. The pipes for the cleansed starch-milk are fitted with controllable stop-valves. The pipes for the saturated water open into the atmosphere. The drawing-off pipe 18 for sand is fitted with a cock. The pipe 17 for the lighter starch is preferably on the last apparatus of the set. The sand-pipe 18 is nearly in the middle of the bottom of the vessel 3, since the sand, as is known, collects in the middle of the centrifugal vessel, probably on account of the greater friction. By occasionally opening the sand-outlet the starch-milk is freed from the sand.

The crude starch-milk is, as mentioned, continuously supplied to the first apparatus 3 through the hollow shaft 4 in an automatically-regulated quantity and in this vessel is subjected to centrifugal action. In consequence of the rapid rotary movement of the vane 10 a separation of the crude starch-milk is effected. The previously-cleansed starch-milk flows away through the pipe 16. The concentration thereof is regulated at will by regulating the amount of opening of the valve. The saturated water is led away through the pipe 15. A pipe 19 is joined to pipe 16 and conveys the starch-milk from the first apparatus 3 into the second, 20. The kinetic energy imparted to the starch by the centrifugal force is sufficient to cause it to overcome the incline of the pipe 19.

The apparatus 20 receives the starch-milk previously cleansed in the apparatus 3 through the pipe 19, which, if desired, can discharge, as in the apparatus 3, into the driving-shaft 21 of the vane 22, said shaft being made hollow accordingly. The starch-milk in the apparatus 20 is separated again into purer starch-milk and saturated water. The starch-milk is led through the pipe 23 into the following, and in the present case the last, apparatus 24, and the saturated or drain water returns through the pipe 25 back into the first apparatus, so as here to greatly thin the crude starch-milk, whereby the centrifugal ejection is facilitated, and also the saturated water is replaced by pure water. With the last apparatus 24 the starch-milk is treated in the same manner and cleansed as before and leaves the installation through the pipe 26 as cleaned and concentrated starch for further treatment. On the apparatus 24 are further the pipes 17 for lighter starch. The drain-water of this apparatus is led back through pipe 27 into the preceding apparatus. In order to facilitate the leading away of the various fluids with the aid of centrifugal force, the individual pipes 25, 23, and 27 are joined tangentially to their apparatus, as shown in Fig. 3. Pure water is supplied to the last apparatus 24 by a pipe 28, the supply being suitably regulated by a float in the usual manner from a reservoir, such as 29. Thus the crude starch-milk makes its passage through the installation from the preliminary vessel 1 under gradual cleansing up to the intercepting vessel 30 for the purified starch, while the clean water describes the opposite way and hereby becomes continually more charged with the impurities and saturations of the starch-milk.

I claim—

1. The herein-described process of treating crude starch-milk consisting in continuously subjecting the same to a plurality of centrifugal actions as it flows in one direction and passing the saturated water in the opposite direction, substantially as described.

2. The herein-described process of treating crude starch-milk which consists in continuously subjecting the same to a plurality of successive centrifugal actions as it flows in one direction, mingling fresh water with the milk during the last centrifugal action, and passing the water from each succeeding centrifugal action to each preceding action, substantially as described.

In witness whereof I have hereunto set my hand in presence of two witnesses.

RICHARD SCHRADER.

Witnesses:
  WOLDEMAR HAUPT,
  HENRY HASPER.